F. P. BROWN.
HAND TRUCK.
APPLICATION FILED NOV. 15, 1909.
970,787.
Patented Sept. 20, 1910.
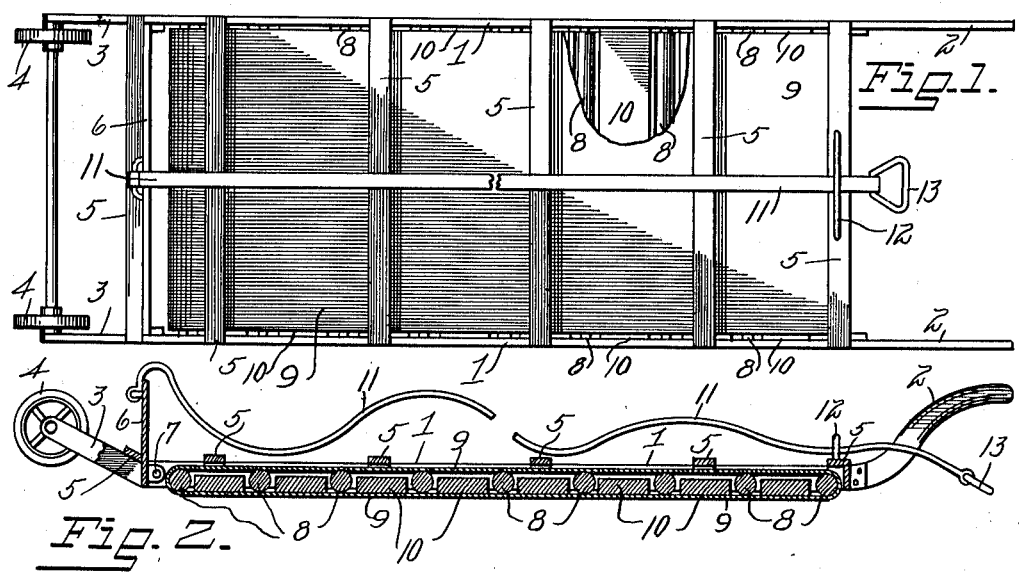
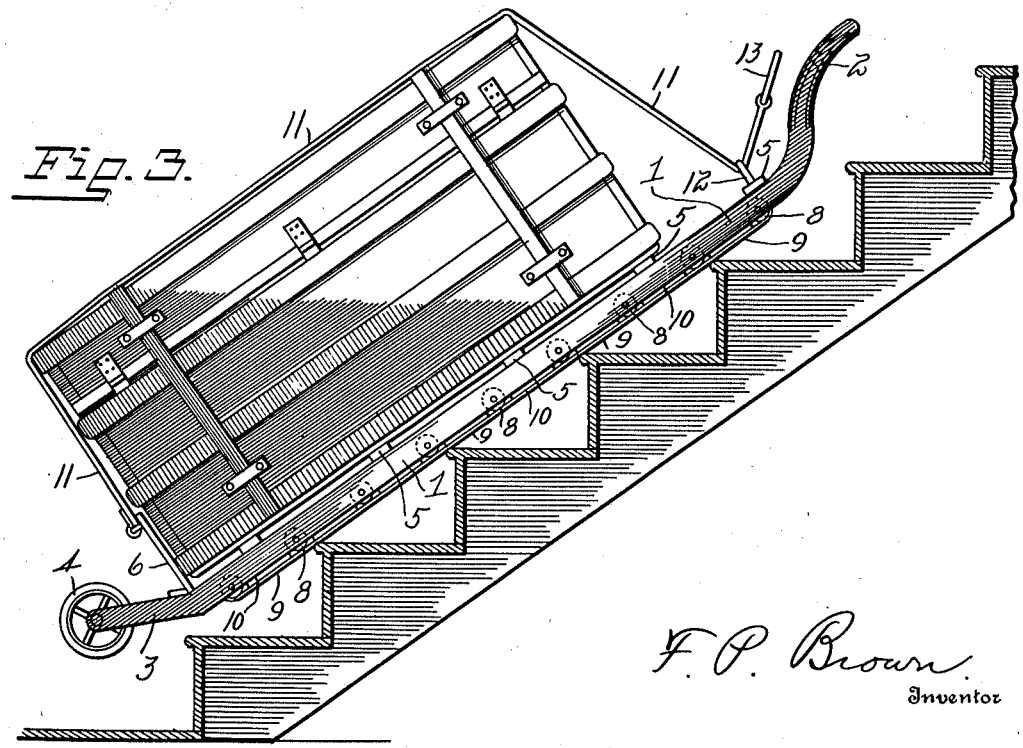

UNITED STATES PATENT OFFICE.

FRANKLIN P. BROWN, OF DAYTON, OHIO.

HAND-TRUCK.

970,787.  Specification of Letters Patent.  Patented Sept. 20, 1910.

Application filed November 15, 1909. Serial No. 528,034.

*To all whom it may concern:*

Be it known that I, FRANKLIN P. BROWN, a citizen of the United States, residing at Dayton, in the county of Montgomery and State of Ohio, have invented certain new and useful Improvements in Hand-Trucks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in hand trucks, and is especially adapted for transporting trunks up and down stairways as well as over straight surfaces.

The object of the invention is to provide a truck which is adapted to the above purposes and by means of which trunks or other heavy articles may be conveyed over fine floors or stairways without endangering the floors or stairways. In other words, the floor or stairway is prevented from being indented or marred in the least in conveying the trunk thereover.

The peculiar advantages and desirable features of the invention will be more particularly described in the following specification and claims in connection with the accompanying drawings, of which—

Figure 1 is a top plan view of my improved truck. Fig. 2 is a longitudinal sectional view. Fig. 3 is a side elevation of the truck, showing the same in position upon a stairway and supporting a trunk.

The framework of the truck consists of two side members 1—1 which terminate at one end in upwardly curved portions 2—2 which provide handles and at the other end in upwardly extended portions 3—3 in which is mounted the axle for rubber tired wheels 4—4 which are used when the truck is elevated at one end as in the ordinary case of usage. The side members 1—1 are attached to a suitable number of cross pieces 5 which combine with said side pieces in producing a rigid truck frame. The cross pieces 5 also serve as supporting members for the articles conveyed upon the truck, such for example as a trunk. Extending from the front end of the truck frame is a plate 6 pivoted at 7 which, when in an upright position, prevents the trunk from slipping forwardly on the truck. The plate 6, owing to the position of its pivot may be folded against the truck frame and thus be made to occupy less space.

Mounted between the side members 1—1 of the truck frame and extending a suitable distance below the same, are a suitable number of rollers 8 which are utilized in moving the truck on a level surface or over a stairway. The rollers 8 receive the weight of the truck in such case and the trunk is also supported thereby when the device is ascending or descending a stairway. Passing around the series of rollers 8 is an endless belt which incloses the lengths of said rollers 8 as well as the lengths of the cross members 10 of which there is a series located between said rollers and secured between the side members 1—1 of the frame. The endless belt 9 so passing around and inclosing the rollers 8 and cross slats 10, is essentially of a pliable or flexible nature and is preferably constructed of carpet or canvas. The said belt 9 prevents the rollers and cross slats from engaging the floor or steps when the device is being moved over either, and thus any possible marring or injury to the wood-work is avoided. It will be noted that the lower surfaces of the rollers 8 and the cross members or slats 10 lie below the lower surfaces of the side members 1—1 of the truck frame. It will therefore be seen that the side members 1—1 are prevented from engaging the floor or stairway when the device is being moved over either. The lower run of the belt 9 is normally at rest when the truck is being thus moved and the rollers travel over the same freely. In order to prevent said rollers from bumping against the edges of the steps, a series of cross members 10 before referred to, are interposed between said rollers and the lower surfaces of these cross members or slats are flush with the lower surfaces of said rollers. The said cross members or slats 10 thus close the spaces between the rollers and prevent the edges of the steps from driving the endless belt between the rollers and thus impeding the movement of the device. The said cross members also provide with the rollers, a substantially plane surface over which the lower run of the belt passes.

A strap 11 is provided for holding the trunk in position while the truck is ascending or descending a stairway. The said strap is attached at one end to the plates 6 and is adapted to pass over the top of the trunk and under a loop 12 secured to the foremost cross piece 5, at which the said strap is provided with a handle 13 which may be gripped by the operator to hold the same tight in manipulating the truck. For example, in ascending a stairway the operator may pull upon the strap 11 to hold the trunk firmly on the truck, and at the same time the truck is moved over the stairway.

I desire to claim:

1. A truck comprising side members united to a suitable number of cross pieces to provide a rigid frame, said side members providing upturned handles at one end and upwardly extended journal extensions at the other end, wheels supported upon said upturned journal extensions, a series of rollers mounted between said side members, a series of cross pieces mounted between said side members and parallel with the rollers, the lower surfaces of said rollers and cross pieces coinciding and lying below the lower surfaces of the side members, and an endless belt passing around said rollers and cross pieces and inclosing the entire lengths thereof, substantially as specified.

2. In a truck, parallel side members united to cross pieces to provide a frame, said frame having truck wheels at one end which lie upwardly and out of the plane of the side members and serve as the transporting wheels when the truck is elevated, in combination with a series of rollers mounted between said side members and serving as the transporting means when the truck is moved horizontally, and an endless belt surrounding said rollers and inclosing them substantially throughout their lengths.

3. In a device of the class specified, a frame consisting of side members united to suitable cross pieces, the forward ends of said side members being extended upwardly to provide bearings for wheels mounted at the front end of the truck, and the rearward ends of said side members providing handles, a series of rollers mounted between said side members, the lower surfaces of said rollers lying below the lower surfaces of said side members and an endless belt passing around said rollers and inclosing the same substantially throughout the lengths thereof.

In testimony whereof I affix my signature, in presence of two witnesses.

FRANKLIN P. BROWN.

Witnesses:
MATTHEW SEIBLER,
HOWARD S. SMITH.